United States Patent [19]

Kousek

[11] Patent Number: 4,638,870

[45] Date of Patent: Jan. 27, 1987

[54] MOTOR DRIVEN HAND-HELD DEVICE CONTAINING A DISPLACEMENT MASS

[75] Inventor: Heinz Kousek, Feldkirch-Tisis, Australia

[73] Assignee: Hilti Aktiengesellschaft, Schaan, Liechtenstein

[21] Appl. No.: 680,390

[22] Filed: Dec. 11, 1984

[30] Foreign Application Priority Data

Dec. 21, 1983 [DE] Fed. Rep. of Germany ....... 3346215

[51] Int. Cl.[4] ............................................. B23Q 5/00

[52] U.S. Cl. .................................... 173/12; 200/220; 408/6

[58] Field of Search ....................... 173/12, 20; 81/479; 338/32 H; 200/220, 190; 310/11; 192/142 R, 150; 408/5, 6

[56] References Cited

U.S. PATENT DOCUMENTS

| | | | |
|---|---|---|---|
| 3,482,196 | 12/1969 | Vecchio, Jr. et al. | 200/220 |
| 3,823,333 | 7/1974 | Spierings | 310/11 |
| 4,218,626 | 8/1980 | Fukuda et al. | 338/32 H |
| 4,319,236 | 3/1982 | Brace et al. | 338/32 H |
| 4,448,261 | 5/1984 | Kousek et al. | 173/12 |

*Primary Examiner*—Donald R. Schran
*Assistant Examiner*—James L. Wolfe
*Attorney, Agent, or Firm*—Toren McGeady Goldberg

[57] ABSTRACT

A motor driven hand-held device for rotating a tool, includes a housing with an axis of rotation containing an electrically conductive liquid mass located within a sealed non-electrically conductive container. A magnetic field is established in the housing by a permanent magnet and a part of the liquid mass is located within the magnetic field. If the housing is turned or twisted around the axis of rotation, relative movement takes place between the liquid mass and the container in the magnetic field. Due to the movement of the mass in the magnetic field, a voltage is induced in the mass and the voltage can be tapped by electrodes extending into the container. The tapped voltage can be used as an electrical signal.

7 Claims, 2 Drawing Figures

MOTOR DRIVEN HAND-HELD DEVICE CONTAINING A DISPLACEMENT MASS

BACKGROUND OF THE INVENTION

The present invention is directed to a motor driven hand-held device for imparting rotary motion to a tool mounted in the device. The device includes a housing with a mass located within the housing and movable in a plane extending perpendicularly to the axis of rotation of the tool.

In hand-held devices, the reaction moment occurring at the tool during rotation must be supplied by the operator. Under normal operating conditions such a counteraction can be easily provided. As an example, however, when drilling in an inhomogeneous material, the drill can suddenly become jammed or completely blocked. Such an occurrence leads to a rapid in the required reaction moment and generally the operator is not prepared to apply such a risen moment. Under operating conditions such an occurrence may result in injury to the operator. If the operator is working on scaffolding or a ladder, there is the further danger of a loss of balance which increases the possibility of injury.

To reduce the possible exposure to accidents, it is well known to provide a clutch which reacts at a certain torque between the drive motor and the tool axis. Actuation of such a so-called overload clutch assumes, however, the application of a corresponding counter-torque by the operator. Accordingly, such a clutch affords an overload protection for the hand-held device and is only conditionally suited to protect the operator.

In another known device, a mass is located within the housing of the device and is movable in bearings in a plane extending essentially perpendicularly to the tool axis. If the device should be twisted about the axis of rotation, for any of the reasons listed above, because of its inertia, the mass is displaced relative to the housing and can operate a switch. The actuation of the switch can, for instance, be utilized to interrupt the supply of energy to the drive motor or for the operation of a disconnect clutch or a brake.

This well known arrangement, however, has several disadvantageous features. By mounting the mass in a bearing, bearing friction is developed which influences the operation of the switch. Further, oscillations can be excited in the mass, such as by vibrations, and cause a resonance resulting eventually in the actuation of the switch though there is no interference in the proper operation of the tool. The resonance of the mass can be prevented by damping, however, if an actual interruption or blockage of the operation of the tool occurs, the actuation of the switch is delayed time-wise due to the damping action.

SUMMARY OF THE INVENTION

The primary object of the present invention is to provide the simple arrangement of a hand-held device which affords the rapid detection of undesired torque acting suddenly on the device and independently of outside influences, such as temperature, contamination or the like.

In accordance with the present invention, a liquid mass is enclosed in a sealed non-electically conductive container. The mass is formed of an electrically conductive liquid and means are provided extending through the container into the mass for the tapping or take-off of voltage induced in the mass due to its movement relative to a magnetic field. In the present invention, by using a liquid mass, the mechanical friction of a solid mass dependent on various factors such as the state of lubrication, temperature and the like is replaced by the considerably lower friction of the liquid mass. The liquid is hermetically sealed in the container. If, during operation of the hand-held device it is suddendly twisted around the axis of rotation of the tool, the liquid mass because of its inertia rotates relative to the housing around its own axis. Such movement of the mass relative to the housing can be transformed to an electrical signal based on the laws of electromagnetism or the interrelation of a current carrying conductor with a magnetic field.

To obtain a usable signal in the operation of the device, it is desirable that the mass is located at least partially within a magnetic field. Through a relative movement of the mass traversing the magnetic field, a voltage is induced in the region of the mass located in the magnetic field and such voltage can be measured and used as a signal.

By reversing this principle, a voltage can be applied to the electrically conductive liquid mass. If the mass, acting as a current carrying conductor, moves through the magnetic field, a field change is created which can be measured and utilized as a signal.

Furthermore, electric coils can be utilized for creating the magnetic field. Such coils, however, involve an energy loss and have the additional disadvantage of becoming heated during a period of operation. Accordingly, it is preferable to provide a permanent magnet for establishing the magnetic field. A permanent magnet does not require much space and continuously creates a constant magnetic field. The establishment of the magnetic field in the mass can be obtained by yokes connected with the magnet.

To measure or apply a voltage to the liquid mass, it is necessary to provide contact points in the mass. Therefore, it is desirable to use electrodes in electrical connection with the liquid mass for effecting the tapping or take-off of the voltage. Good electrical conductors, such as copper, silver or gold, can be employed as the electrodes. The electrodes extend through the walls of the container. Since there is no relative movement between the electrodes and the container, the passage of the electrodes through the container wall can be sealed without any problems.

As indicated above, movement of the mass relative to the magnetic field can be determined by tapping the voltage induced in the mass. The voltage generated, however, is very low and must be electrically amplified.

In a preferred arrangement, the take-off means may be an induction element. Such an element could be an additional coil. If the poles of this additional coil are arranged to be displaced with respect to those of a first coil analogous to the construction of an alternating current meter, a voltage is generated by movement of the mass relative to the second coil.

Instead of a second coil, it is possible to utilize a semiconductor element for the take-off of the voltage, particularly a so-called "hall-element", by way of an induction element.

In principle, it is possible to use different materials as the liquid mass as long as they are electrically conductive. It would be possible to use concentrated salt solutions or a similar liquid. For reliable operation of the device, it is advantageous if the mass has a certain minimum weight. Due to the relatively low density of salt solution, a large enclosing container may be needed. To avoid such a possibility, it is desirable to use mercury as the liquid mass. Mercury has a very high density and thus provides a high moment of inertia. The electrical conductivity of mercury is good and no interfering galvanic potentials can occur. Mercury remains in the liquid state over a broad temperature range and its viscosity is very low. Due to the high surface tension of mercury, the surface of the container, preferably formed of a synthetic material, does not become wetted. A possible air bubble in the container would remain stationary and not interfere with the operation of the device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 2:
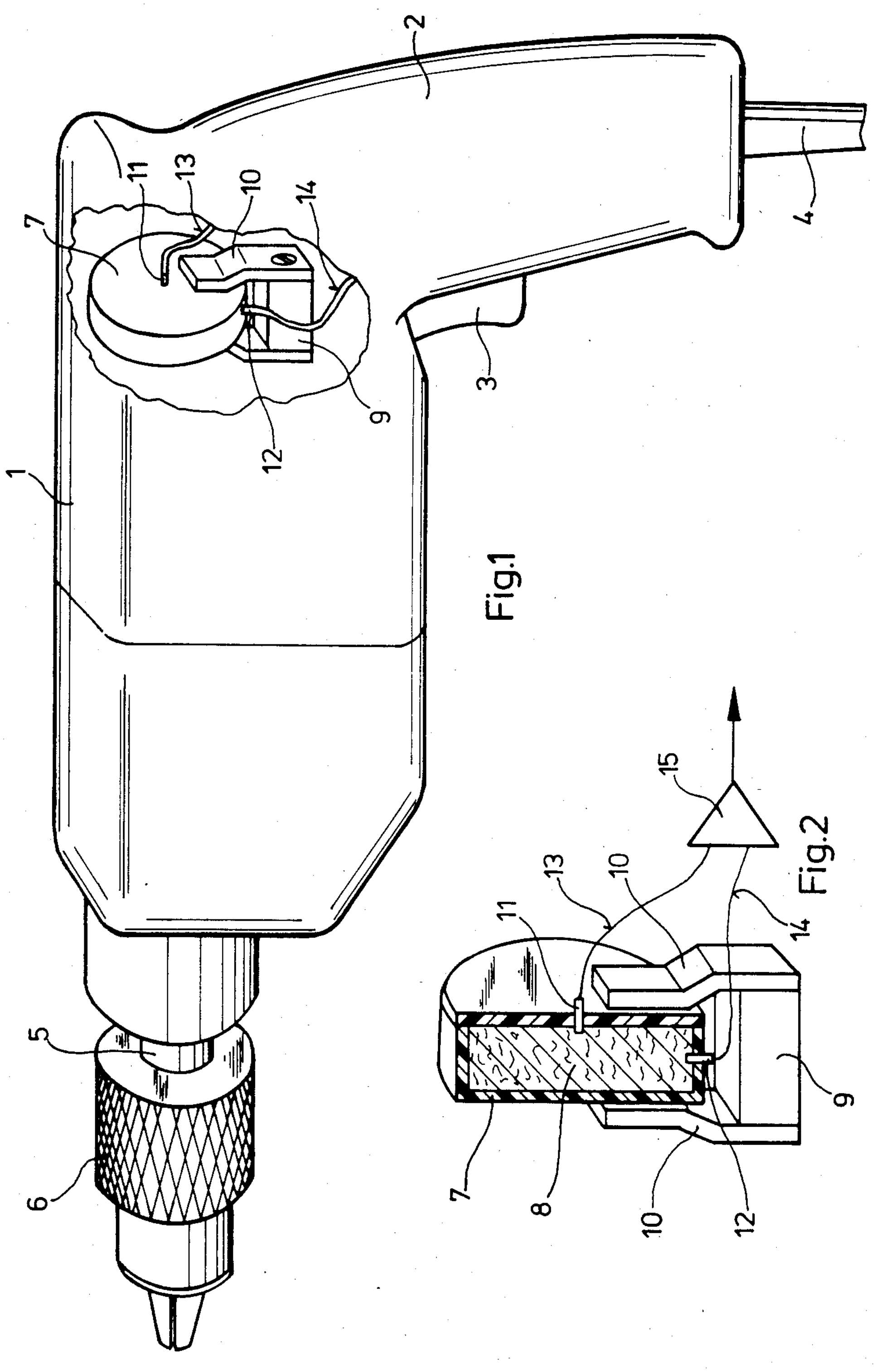
FIG. 1 a perspective view, partly broken away, of a hand-held drilling device embodying the present invention.
FIG. 2 is a sectional view on an enlarged scale of a portion of the drilling device illustrated in FIG. 1.

A hand-held drilling device is illustrated in FIG. 1 and includes a housing 1 having a front end at the left and a rear end at the right as viewed in FIG. 1. A handle 2 extends downwardly from the rear end of the housing 1 and can be gripped by the hand of an operator. A trigger-like switch 3 is located in the handle and a wire 4 extends from the handle for supplying power to the device. At the front end of the housing 1, a drilling spindle 5 extends axially outwardly forming a projection of the rear end-front end direction of the housing. Accordingly, the housing 1 has an axis of rotation forming a continuation of the axis of the drill spindle 5. A chuck 6 is mounted on the drill spindle for holding and securing drilling tools or the like in the device.

Adjacent the rear end of the housing 1, a container 7 is positioned above the handle 2. The container is cylindrically shaped with a short cylindrical axis which extends generally parallel to the axis of rotation of the housing. Container 7 is hermetically sealed and contains, as shown best in FIG. 2, a liquid serving as a mass 8. Liquid mass 8 is electrically conductive and should have a density which is as high as possible. Preferably, liquid mercury is used as the mass 8. Furthermore, mercury has a high surface tension and, as a result, does not wet the inside walls of the container 7. The container 7 is formed of a non-electrically conductive material. While the use of mercury is preferred, it would also be possible to use concentrated salt solutions. Container 7 is rigidly secured to the housing 1. As viewed in FIG. 1, a permanent magnet 9 is positioned in the housing exteriorly of and adjacent to the container 7. A yoke 10 is located on each of the opposite sides of the permanent magnet, that is, the sides spaced apart in the front end-rear end direction of the housing. Due to the position of the yokes 10 extending upwardly from the permanent magnet adjacent a portion of the outside surface of the container 7, the liquid mass 8 in the container is located partially in a magnetic field created by the permanent magnet. At approximately its cylindrical axis, an electrode 11 extends through one wall of the container while another electrode 12 extends through the circumferential wall of the container. The electrodes 11, 12, extend into the interior of the container and are electrically connected with the liquid mass 8. Magnet 9 and its associated yokes 10 are also rigidly attached to the housing 1. Preferably, the container is in the shape of a flat round can or cylinder with its axis parallel to the axis of the drill spindle 5, that is, the axis of rotation of the housing 1.

During operation of the drilling device, if the tool mounted in the device should become seized, a sudden twisting of the housing around the axis of rotation would take place. When such twisting or turning action occurs, due to the inertia of the mass, relative movement occurs between the liquid mass 8 and the container 7 or permanent magnet 9 fixed to the housing. As a result, there is relative movement between the liquid mass and the container around the cylindrical axis of the container 7. Accordingly, the mass moves as a conductor through the magnetic field generated by the permanent magnet 9 and the yokes 10. In the course of such relative movement, a voltage is induced in the mass 8. The voltage can be tapped at the electrodes 11, 12 and used as a signal for triggering a certain function, for instance, switching off the power supply to the device or actuating a clutch or a brake. Thus, electrodes 11, 12 are provided with connecting wires 13, 14, respectively. Since the strength of the signal is relatively small or weak, it is possible, as illustrated in FIG. 2, initially to pass the signal through an amplifier 15.

While specific embodiments of the invention have been shown and described in detail to illustrate the application of the inventive principles, it will be understood that the invention may be embodied otherwise without departing from such principles.

I claim:

1. Motor driven hand-held device for imparting rotary movement to a tool inserted into said device, comprising a housing having a rotational axis, a mass located within said housing, a sealed container located within said housing and formed of a non-electrically conductive material, said container comprises a hollow cylinder with the cylindrical axis diposed in parallel relation with the rotational axis of said housing, said cylinder is rigidly secured to said housing, said mass located within said container and comprising an electrically conductive liquid, said container arranged in said housing so that said mass is movable relative to said container in a direction extending perpendicularly of the rotational axis, means within said housing for forming a magnetic field with said electrically conductive liquid at least partially traversing said magnetic field, and means for tapping voltage induced in said electrically conductive liquid by the relative movement of said electrically conductive liquid with respect to the magnetic field.

2. Motor driven hand-held device as set forth in claim 1 wherein said means for forming a magnetic field comprises a permanent magnet for generating the magnetic field with said permanent magnet located adjacent said container.

3. Motor driven hand-held device, as set forth in claim 2, wherein said container has a pair of opposite ends spaced apart in the direction of the cylindrical axis thereof said permanent magnet rigidly secured in said housing and located adjacent the circumferential periphery of said container, a yoke connected to each of two opposite sides of said permanent magnet which sides are spaced apart in the direction of the rotational axis of said housing, and said yokes projecting from said permanent magnet inwardly toward the cylindrical axis of said container adjacent to the opposite ends of said container.

4. Motor driven hand-held device, as set forth in claim 1, wherein said means for tapping voltage comprises a pair of electrodes mounted in said container and extending into said electrically conductive liquid therein.

5. Motor driven hand-held device, as set forth in claim 4, wherein a connecting wire is attached to each of said electrodes and an amplifier connected to each of said wires for amplifying the voltage taken off from said electrically conductive liquid by said electrodes.

6. Motor driven hand-held device, as set forth in claim 1, wherein said means for tapping voltage includes an induction element.

7. Motor driven hand-held device, as set forth in claim 1, wherein said electrically conductive liquid is mercury.

* * * * *